(12) United States Patent
Sandstrom (10) Patent No.: US 8,490,111 B2
(45) Date of Patent: Jul. 16, 2013

(54) EFFICIENT NETWORK AND MEMORY ARCHITECTURE FOR MULTI-CORE DATA PROCESSING SYSTEM

(75) Inventor: Mark Henrik Sandstrom, Jersey City, NJ (US)

(73) Assignee: Throughputer, Inc., Jersey City, NJ (US)

( * ) Notice: Subject to any disclaimer, the term of this patent is extended or adjusted under 35 U.S.C. 154(b) by 31 days.

(21) Appl. No.: 13/270,194

(22) Filed: Oct. 10, 2011

(65) Prior Publication Data

US 2012/0266183 A1 Oct. 18, 2012

Related U.S. Application Data

(60) Provisional application No. 61/539,616, filed on Sep. 27, 2011.

(51) Int. Cl.
*G06F 3/00* (2006.01)
(52) U.S. Cl.
USPC .......................................................... 719/312
(58) Field of Classification Search
USPC ................................................ 719/311, 310
See application file for complete search history.

(56) References Cited

U.S. PATENT DOCUMENTS

| | | | | |
|---|---|---|---|---|
| 5,519,829 | A * | 5/1996 | Wilson | 345/530 |
| 5,809,516 | A * | 9/1998 | Ukai et al. | 711/114 |
| 7,099,813 | B2 * | 8/2006 | Nightingale | 703/20 |
| 7,738,496 | B1 * | 6/2010 | Raza | 370/503 |
| 8,098,255 | B2 * | 1/2012 | Fouladi et al. | 345/558 |

OTHER PUBLICATIONS

Wei Han, Multi-core Architectures with Dynamically Reconfigurable Array Processors for the WiMAx Physical layer, 2008.*

* cited by examiner

*Primary Examiner* — Lechi Truong (57) ABSTRACT

The invention provides hardware logic based techniques for a set of processing tasks of a software program to efficiently communicate with each other while running in parallel on an array of processing cores of a multi-core data processing system dynamically shared among a group of software programs. These inter-task communication techniques comprise, by one or more task of the set, writing their inter-task communication information to a memory segment of other tasks of the set at the system memories, as well as reading inter-task communication information from their own segments at the system memories. The invention facilitates efficient inter-task communication on a multi-core fabric, without any of the communications tasks needing to know whether and at which core in the fabric any other task is executing at any given time. The invention thus enables flexibly and efficiently running any task of any program at any core of the fabric.

8 Claims, 7 Drawing Sheets

EFFICIENT NETWORK AND MEMORY ARCHITECTURE FOR MULTI-CORE DATA PROCESSING SYSTEM

CROSS-REFERENCE TO RELATED APPLICATIONS

This application claims the benefit of the following provisional application, which is incorporated by reference in its entirety: U.S. Provisional Application No. 61/539,616, filed Sep. 27, 2011.

BACKGROUND

1. Technical Field

This invention pertains to the field of digital data processing, particularly to the fields of inter-task communications and inter-core memory image transfers in a data processing system comprising multiple processing cores dynamically shared by tasks of multiple data processing programs.

2. Descriptions of the Related Art

Computing systems will increasingly be based on multiple processing cores, even in case of traditional single-user devices such as personal computers (PCs), tablet PCs, mobile phones, communicators etc, as well as in higher capacity server type computers. Single software applications will accordingly increasingly be executing on multiple such processing cores in parallel, while the computing hardware (comprising multiple processing cores) will be shared by a number of software applications, some of which may belong to different users. As a result, the set of application program processing tasks running on the set of cores of a given multi-core based computer will need to be updated, potentially highly frequently, in order to pursue sufficiently high application program level as well as system wide processing throughput. To enable such dynamic updating of processing tasks for the set of processing cores, innovations are needed to support efficiently transferring the processing context (e.g. latest state of processing data and interim results, and possibly instructions) of any given task to any core of the system, as well as to support efficient communication among the tasks of an application program running on the multi-core data processing system. Particular challenges to be solved include achieving cost-efficient scalability of such inter-core and inter-task communications networks as the number of cores and processing applications and their tasks continuous to grow, while supporting restriction-free, dynamically optimized allocation of the system processing resources to enable high efficiency of system resource usage under varying processing loads presented by the application programs and their tasks.

SUMMARY

The invented techniques enable a set of software program tasks to efficiently run on a dynamically shared data processing hardware comprising multiple processing cores. More specifically, the invention provides hardware logic based techniques for data processing tasks of a software program to efficiently communicate with each other while running in parallel on a dynamically allocated array of processing cores of a data processing platform. The cores here refer to any types of computing, software program or data processing engines such as central processing units (CPUs), graphics processing units (GPUs), or application specific processors (ASPs).

According to an embodiment, the invention provides an on-chip network for a multi-core fabric based data processing platform, to support non-blocking switching of tasks of software programs for cores of the fabric, as well as to support inter-task communication, through efficiently arranged access to fabric memories. Specifically, aspects of such on-chip network provide logic, wiring, memory etc. system resource efficient support for executing any application task at any core within the fabric at any given time, as controlled by a controller that regularly optimizes the allocation of cores of the fabric among the application software programs on the system, as well as maps specific application tasks to specific processing cores. The minimized overhead inter-task communications, also supported by the on-chip network, further facilitates resource efficiently achieving high performance for the application programs dynamically sharing the multi-core based data processing platform.

Moreover, the fabric network according to embodiments of the invention enables running any application program task on a multi-core data processing fabric at any of its cores at any given time, in a restriction free manner, with minimized overhead, including minimized core idle times, and without a need for the system software during the system runtime operation. According to the described embodiments of the invention, the fabric network achieves this flexible use of the cores of the system logic and wiring resource efficiently, without a need for either application to application level, task to task level or core to core level cross-connectivity, as well as memory efficiently without a need for the cores to hold more than one task's image within their memories at a time. Instead of needing application task to task or core to core cross-connects for inter-task communications or memory image transfers, the invention achieves their purposes more efficiently through a set of multiplexers connecting the cores to application task specific segments at the fabric memory. The invention thereby also enables application tasks running on any core of the fabric to communicate with any other task of a given application without requiring any such communicating task to know whether and where (at which core) any other tasks are running at any given time. The invented hardware based systems and methods thus also enable flexibly and efficiently running any task of any application on any core of the system, thereby providing high performance and efficient platform for dynamic, parallel execution of software programs. The multi-core fabric network architecture according to the invention thus provides improved efficiency, performance and scalability for parallel processing systems as the number of cores, application programs and tasks within applications grows.

An aspect of the invention provides a digital logic system for a set of processing tasks of a software program to resource-efficiently communicate with each other, while running in parallel on an array of processing cores of a data processing platform providing a memory segment for each task of said set. Embodiments of such systems comprise hardware logic resources i) for any task of the set to write its inter-task communication information to a memory segment of another task of the set; and ii) for any task of the set to read its inter-task communication information from its own memory segment.

A further aspect of the invention provides a method for a set of processing tasks of a software program, while running in parallel on an array of processing cores of a data processing platform providing a memory segment for each task of said set, to efficiently communicate with each other. Embodiments of such method comprise: i) writing, by at least one processing task of the set, its inter-task communication information to a memory segment of another task of the set; and ii) reading, by at least one processing task of the set, inter-task communication information from its own memory segment.

Another aspect of the invention provides a digital logic system for a set of processing tasks of a software program, while running in parallel on an array of processing cores of a multi-core data processing fabric, to communicate with each other, through hardware logic resources for the set of processing tasks to exchange information among each others using a fabric memory that provides a set of task-specific memory segments for storing information being exchanged among the set of processing tasks. Moreover, in embodiments of such a system, at least some of said hardware logic resources are controlled at least in part by a hardware logic based controller that repeatedly assigns processing tasks of software programs for the cores of the array to process.

A yet another aspect of the invention provides a method for a set of processing tasks of a software program, while running in parallel on an array of processing cores of a multi-core data processing platform, to communicate with each other, based on techniques for exchanging information among the set of processing tasks with each others though access from the cores to task-specific memory segments. According to an embodiment of such a method, the exchanging of inter-task communications information is controlled at least in part by a hardware logic based controller that repeatedly assigns tasks of software programs for cores of the array to process.

A yet further aspect of the invention provides a digital logic system for dynamically switching a set of processing tasks of a group of software programs for an array of processing cores of a data processing platform. Embodiments of such a system comprise: i) a set of task-specific memory segments for storing memory images of the set of processing tasks; and ii) hardware logic based on-chip network for transferring task memory images between the set of task-specific memory segments and cores of the array, with at least some aspects of said on-chip network being controlled at least in part by a hardware logic based controller that repeatedly performs assignments of tasks of software programs for the cores of the array to process.

DETAILED DESCRIPTION

The invention is described herein in further detail by illustrating the novel concepts in reference to the drawings.

General symbols and notations used in the drawings:

Boxes indicate a functional digital logic module.

Arrows indicate a data signal flow. A signal flow may comprise one or more parallel bit wires. The direction of an arrow indicates the direction of primary flow of information associated with it with regards to discussion of the system functionality herein, but does not preclude information flow also in the opposite direction.

Figure 1:
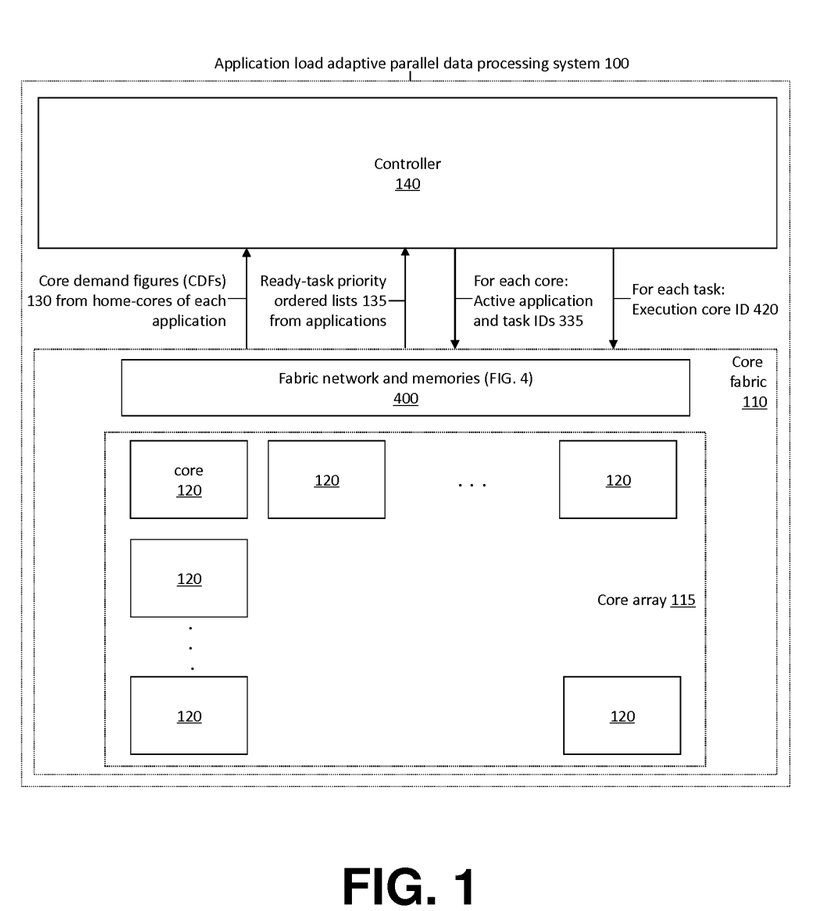
FIG. 1 shows, in accordance with an embodiment of the invention, a functional block diagram for an application program load adaptive parallel data processing system, comprising a multi-core processing fabric, member cores of which are dynamically space and time shared among a set of application software programs, tasks of which communicate with each other through an efficient on-chip network on the multi-core fabric.

A dotted line marks a border of a group of drawn elements that form a logical entity, such as the modules constituting the multi-core processing fabric 110 in FIG. 1.

Lines or arrows crossing in the drawings are decoupled unless otherwise marked.

For clarity of the drawings, generally present signals for typical digital logic operation, such as clock signals, or enable, address and data bit components of write or read access buses, are not drawn in the drawings.

Figure 2:
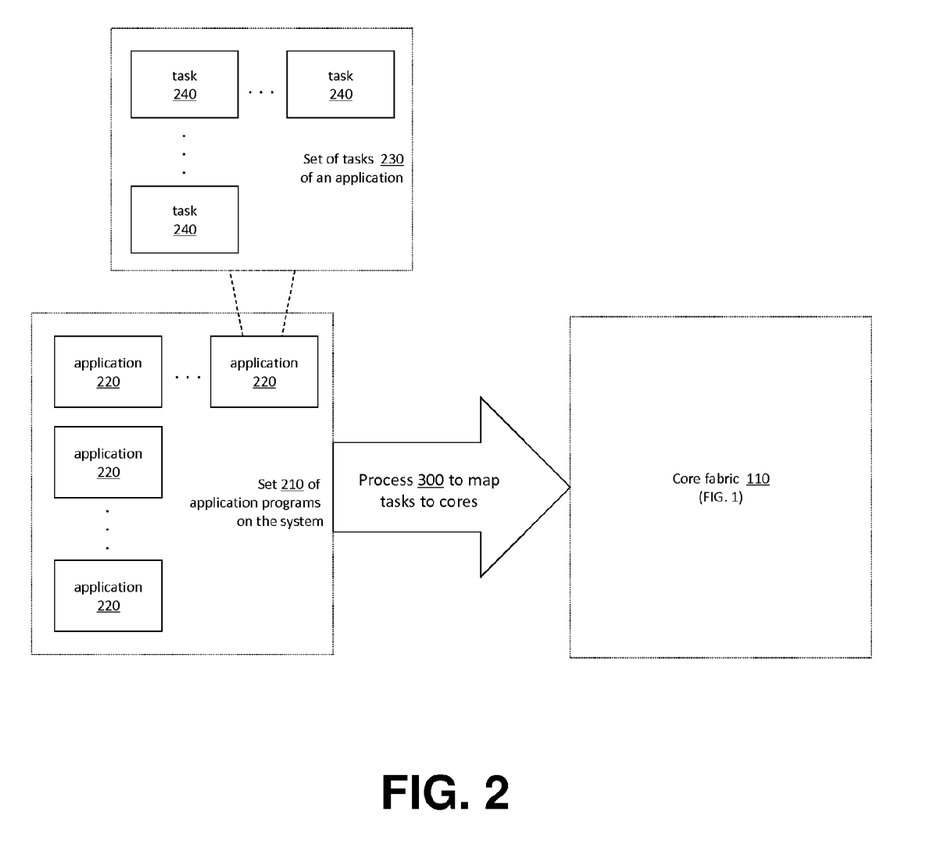
FIG. 2 provides a context diagram for a process, implemented on the system of FIG. 1, to select and map the active tasks of application programs configured to run on the system to their target processing cores, in accordance with an aspect of the invention.
Figure 3:
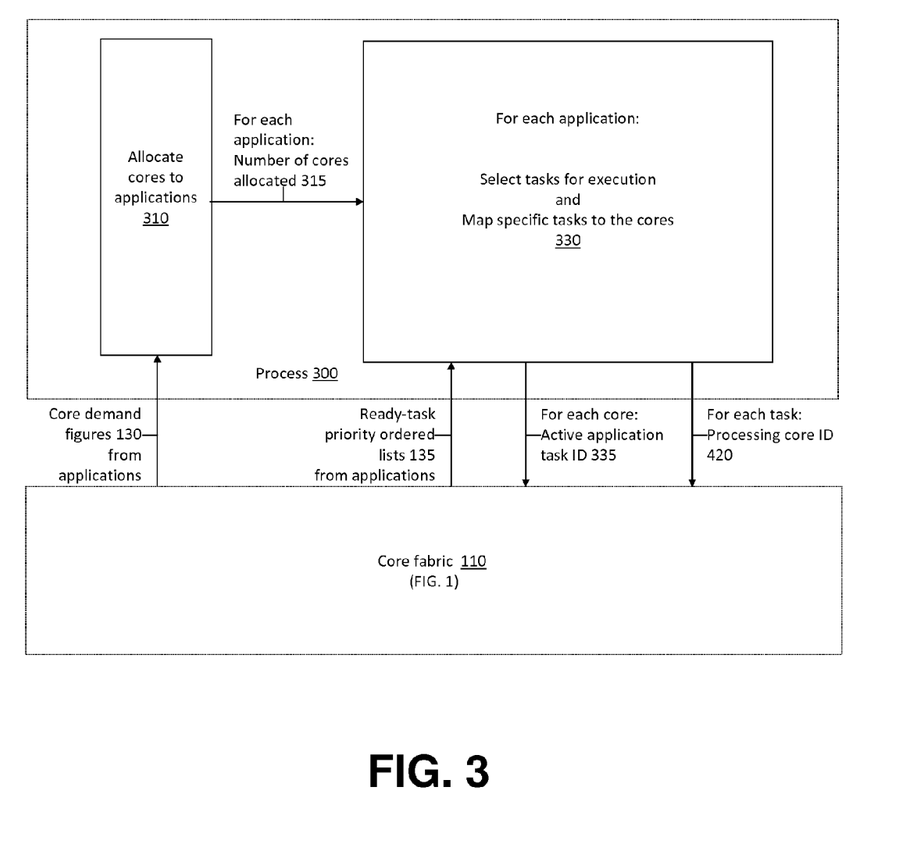
FIG. 3 illustrates, in accordance with an aspect of the invention, the flow diagram and major steps for the process of FIG. 2.

FIGS. 1-3 and related descriptions below provide specifications for a multi-core data processing platform, according to embodiments of aspects of the invention, while FIGS. 4-7 and associated descriptions provide specifications for networking and memory resources to enable dynamically running any data processing task on any processing core of the system as well as to support efficient communications among such processing tasks, according to embodiments of aspects of the invention.

FIG. 1 provides a functional block diagram for an embodiment of the invented multi-core data processing system, with application program processing load adaptive allocation of the cores among the software applications configured for the system, as well as (as described in relation to FIGS. 4-7) efficient inter-core task-switching and inter-task communication resources.

For general context, the system of FIG. 1 comprises processing core fabric 110 with cores 120 for processing instructions and data of a set of software application programs configured run on to shared the system. In such manner processing the application programs to produce processing results and outputs, the cores of the system access their input and output data arrays, which in embodiments of the invention comprise memories and input/output communication ports accessible directly or indirectly to one or more of the cores. Since the present invention is directed primarily to techniques for dynamically sharing the processing cores of the system among its application programs as well as for efficiently running such programs on the cores of the system in parallel, rather than on implementation details of the cores themselves, aspects such as memories and communication ports of the cores or the system 100, though normally present within the embodiments of the multi-core data processing system 100, are not shown in FIG. 1. Moreover, it shall be understood that in various embodiments, any of the cores 120 of a system 100 can comprise any types of software program processing hardware resources, e.g. central processing units, graphics processing units, digital signal processors or application specific processors etc. Embodiments of systems 100 can furthermore incorporate CPUs etc. processing cores that are not part of the dynamically allocated array 115 of cores, and such CPUs etc. outside the array 115 can be used to manage and configure e.g. system-wide aspects of the entire system 100, including the controller module 140 of the system and the array 115.

As illustrated in FIG. 1, the invention provides a data processing system 100 comprising an array 115 of processing cores 120, which are shared by a set of application programs configured to run on the system. In an embodiment of the invention, the individual application programs running on the system maintain at specified addresses within the system 100 memories their processing capacity demand indicators signaling 130 to the controller 140 a level of demand of the system processing capacity by the individual applications. In a particular implementation, these indicators 130, referred to herein as core-demand-figures (CDFs), express how many cores 120 their associated application program is presently able utilize for its data processing tasks. Moreover, in certain embodiments, the individual applications maintain their CDFs at specified registers within the system, e.g. in known addresses within the memory space of their root processes (i.e. task ID#0 of each application), with such application CDF device registers being accessible by hardware logic of the controller module 140. For instance, in an embodiment, the CDF 130 of a given application program is a function of the number of its schedulable tasks, such as processes, threads or functions (referred to collectively as tasks) that are ready to execute at a given time. In a particular embodiment of the invention, CDF of an application program expresses on how many processing cores the program is presently able to execute in parallel. Moreover, in certain embodiments, these capacity demand indicators, for any given application, include a list 135 identifying its ready tasks in a priority order.

A hardware logic based controller module 140 within the system, through a repeating process, allocates and assigns the cores 120 of the system 100 among the set of applications and their tasks, at least in part based on the CDFs 130 of the applications. In certain embodiments, this application task to core placement process 300 (see FIGS. 2 and 3) is exercised periodically, e.g. at even intervals such as once per a given number (for instance 64, or 1024, or so forth) of processing core clock or instruction cycles. In other embodiments, this process 300 can be run e.g. based on a change in the CDFs 130 of the applications 220. Also, in particular implementation scenarios, the conceptual module 140 includes application program specific sub-modules, which run task to core assignment algorithms within a given application program based on a change in the task priority listing 135 for the given application. While such conceptual application-specific sub-modules can impact which application tasks will be executing on the fabric 110, they will not by themselves change the numbers of cores allocated to any given application on the system. Accordingly, these application-internal task selection sub-processes can be run also in between of successive runs of the complete controller 140 process 300. The application task to core assignment algorithms of controller 140 produce, for the cores of the fabric 115, identification of their respective tasks to process 335, as well as for the application tasks on the system, identification of their processing cores 420 (if any, at a given time).

Though not explicitly shown in FIG. 1, embodiments of the system 100 also involve timing and synchronization control information flows between the controller 140 and the core fabric 115, to signal events such as launching and completion of the process 300 (FIGS. 2-3) by the controller as well as to inform about the progress of the process 300 e.g. in terms of advancing of its steps (FIG. 3). Also, in embodiments of the invention, the controller module is implemented by digital hardware logic within the system, and in particular embodiments, such controller modules operate their repeating algorithms, including those of process 300 per FIGS. 2-3, without software involvement. Embodiments for the communications network and memory resources 400 of the core fabric 110 are described in relation to FIGS. 4-7.

FIG. 2 illustrates the context of the process 300 performed by the controller logic 140 of the system 100, repeatedly mapping the to-be-executing tasks 240 of the set of application programs 210 to their target cores 120 within the array 115.

In an embodiment, each individual application 220 configured for a system 100 provides an updating collection 230 of tasks 240, even though for clarity of illustration in FIG. 2 this set of applications tasks is drawn only for one of the applications within the set 210. Note that the terms software application program, application program, application and program are used interchangeably in this specification, and each generally refer to any type of computer software able to run on data processing systems according to any embodiments of the invention. Note further that in certain embodiments, any application program 220 for a system 100 can be an operating system (OS) for a given user of the system 100, with such user OS supporting a number of applications of its own, and in such scenarios the OS client 220 on the system 100 can present such applications of it to the controller 140 of the system as its tasks 240. Moreover, in embodiment of the invention, among the applications 220 there can be supervisory or maintenance software programs for the system 100, used for instance to support configuring other applications 220 for the system 100, as well as provide general functions such as system diagnostics and facilitate access to networking, I/O and system-wide memory etc. resources of the platform 100 by other application programs of the system.

In the general context of FIGS. 1 and 2, FIG. 3 provides a conceptual data flow diagram for an embodiment of the process 300, which maps each selected-to-execute application task 240 within the sets 230 to one of the cores 120 within the array 115.

FIG. 3 presents, according to an embodiment of the invention, the conceptual major phases of the task-to-core mapping process 300, used for maximizing the application program processing throughput of a data processing system hardware shared among a number of software programs. Such process 300, repeatedly mapping the to-be executing tasks of a set of applications to the array of processing cores within the system, involves series of steps as follows:

(1) allocating 310 the array of cores among the set of programs on the system, at least in part based on CDFs 130 by the programs, to produce for each program 220 a number of cores 220 allocated to it 315 (for the time period in between the current and the next run of the process 300); and (2) based at least in part on the allocating 310, for each given application that was allocated at least one core: (a) identifying a number of tasks within the application selected for execution corresponding to the number of cores allocated to the given application and (b) mapping 330 each selected task to one of the available cores of the array 115, to produce, i) for each core of the array, an identification 335 of an application and a task within the application that the given core was assigned to, as well as ii) for each application task selected for execution on the fabric 115, identification 420 of its assigned core, if any, at a given time.

FIGS. 4-7. and related descriptions below describe embodiments for on-chip network 400 of the system 100 and operating scenarios thereof, to achieve non-blocking transferring of memory images of tasks of software programs between cores of the fabric 110, as well as inter-task communication, through efficiently arranged access to fabric memories. The inter-core and inter-task information exchange resources per FIGS. 4-7, in an embodiment of the invention, comprise hardware logic, and are capable of operating without software. The capabilities per FIGS. 4-7 provide logic, wiring, memory etc. system resource efficient support for executing any application task 240 at any core 120 within the system at any given time, as controlled, at least in part, by the controller 140 that regularly optimizes the allocation of cores of the array 115 among the applications 220 on the system 100, as well as maps specific application tasks 240 to specific processing cores 120. The minimum overhead inter-task communications, also supported by the on-chip network 400, further enables resource efficiently achieving high performance for the application software programs that dynamically share the multi-core based data processing platform 100.

Figure 4:
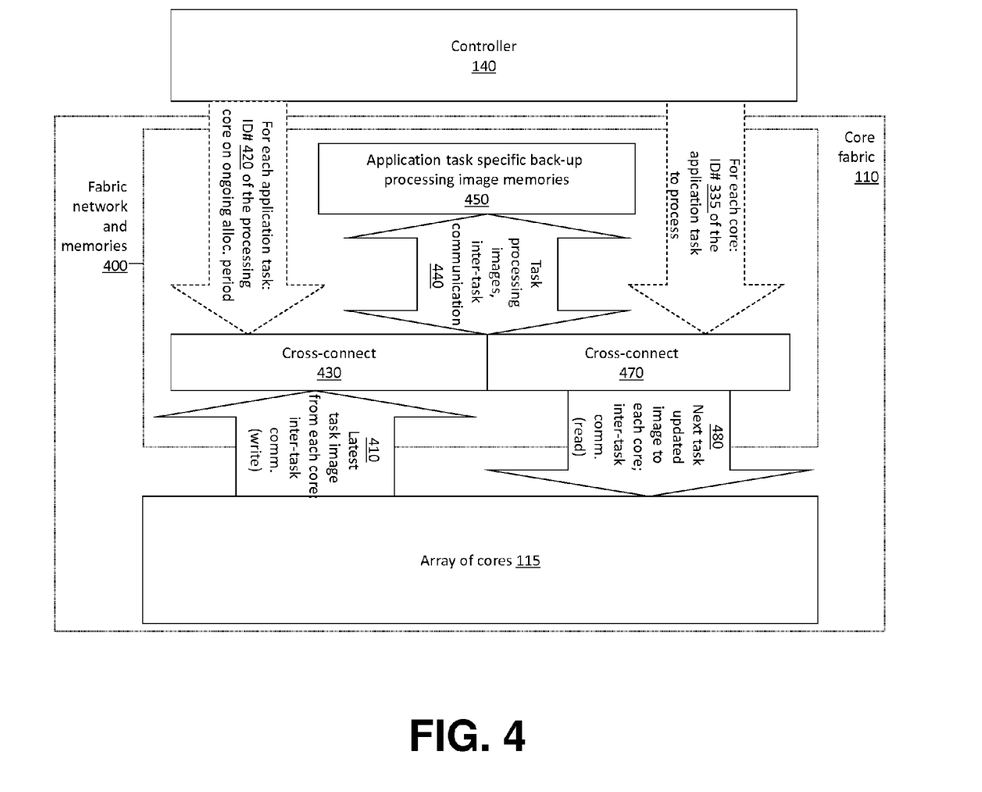
FIG. 4 illustrates, in accordance with an embodiment of the invention, a communications network and memory architecture for the multi-core fabric of system of FIG. 1.

Fabric Network for System of FIG. 1: Transferring Memory Images of Tasks of Software Programs Executing on the System Between Cores and Backup Memories of the Multi-Core Processing Fabric:

FIG. 4 illustrates the task image transfer and inter-task communications network and memory resources 400 for an embodiment of the core fabric 110 (see FIG. 1 for further context of the conceptual module 400). Note that in FIGS. 4-7, for clarity of illustration of the functionality of the inter-core and inter-task communications facilities, certain signals that are primarily control signals (as contrasted with data buses and such) are marked with gapped-line arrows. Examples of such control signals are control information flows provided to direct the multiplexing of the read and write data buses.

Figure 5:
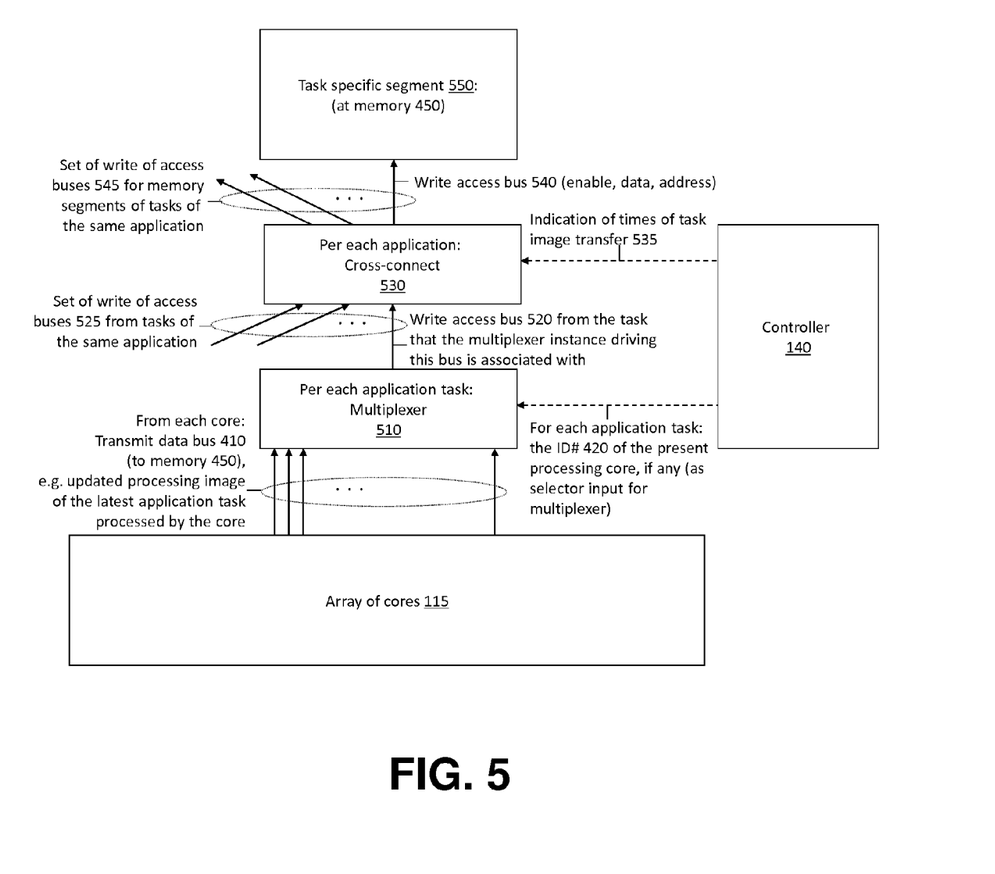
FIG. 5 shows at more detail level a portion of the logic system depicted in FIG. 4 concerning functions of backing up updated task memory images from the cores of the system to the task specific segments in memories within the fabric of system of FIG. 1, as well as writing of inter-task communication information by tasks of application programs running on the system to such memory segments of each others, in accordance with an embodiment of the invention.
Figure 6:
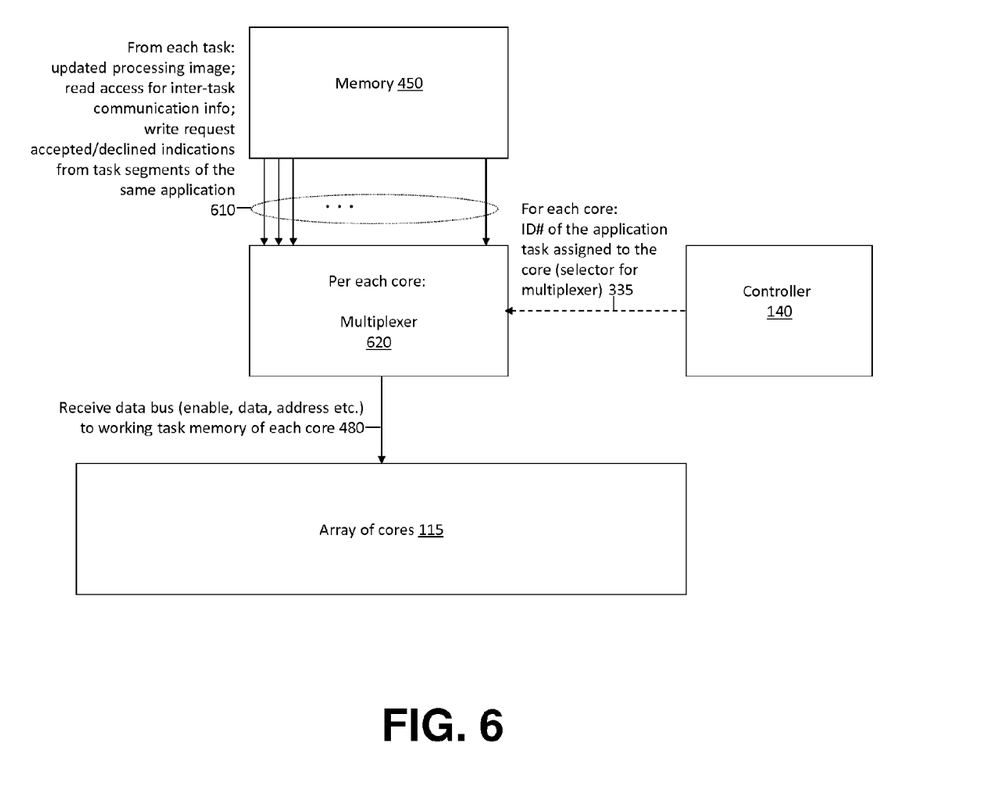
FIG. 6 shows at more detail level, in accordance with an aspect of the invention, a portion of the logic system depicted in FIG. 4 concerning functions of retrieving updated task memory images from the task specific segments in memories of the fabric of FIG. 1 to their next processing cores within the system of FIG. 1, as well as reading of inter-task communication information by tasks of applications running on the system from their segments in such memories.

Regarding system functionality for switching executing tasks for cores of fabric 110, FIG. 4 provides a conceptual diagram for a logic system 400 to back-up and transfer the latest processing memory image (referred to herein on herein also simply as image) of any application program task 240 on the system 100 from and to any core 120 within the array 115, in accordance with an embodiment of the invention. As will be described later on (after the description of FIG. 6), the inter-core network and memory system 400 will be used also for inter-task communication among the application program tasks running on the system 100. Note that in relation to FIGS. 4-7, in embodiments of the invention where the individual core specific memories within the array are not intended to contain the instructions and data for all the application tasks on the system, but rather for the specific task assigned to any individual core at a given time, the notion of task processing image refers to the memory image used by the processing of the task. Various embodiments, implementing various designs between (and including) the extremes, on one end, of each core providing a dedicated memory segment for each application task on the system and, on the other end, of each core providing a plain working memory holding the memory image of the application task assigned to it, will have their corresponding definitions of what information needs to be transferred between cores and interim memories (if any) to backup, retrieve or relocate a task. In scenarios studied in detail in the following in connection with FIGS. 4-7, it is assumed that each core of the array 115 holds in its memory the image of the application task assigned to it at a given time. Such a scenario significantly reduces the amount of memory needed by the individual cores as well as across the system 100, while it calls for a capability to transfer the task processing memory images between cores and back-up memories when having to resume processing of a task after a period of inactivity, possibly at a different core than its previous processing core. FIGS. 4-6 and related descriptions below illustrate a logic system with such a memory image transfer capability.

In a particular operating scenario, at end of any given core to task allocation period or after the set of tasks of any given application selected for execution chances (even within a core allocation period), each such core within the system that got assigned a different next task to process (with such cores referred to as cores subject to task switchover), backs up 410 the updated processing image of its latest task to a memory 450 that provides a dedicated memory segment 550 and related access logic (FIGS. 5-7) per each application task configured for the system 100. Specifically, in an embodiment, logic at XC 470 provides, at least conceptually as part of the bus 480, indications to the cores 120 regarding task switchovers, in response to which system software at the cores subject to a switchover causes the existing task to be backed up 410 to its segment 550 at memory array 450 and, following that, to retrieve 480 the next task's image from its segment 550 at memory array 450. Moreover, in a particular embodiment, after a core subject to task switchover has backed up 410 its outgoing task, the core will signal back to its multiplexer (element 620 in FIG. 6) at XC 470 to apply the provided new configuration 335, to cause the incoming application's image to be transferred 480 (under control of the core's system software) to the working memory of the core, and so that the incoming task to execute on the core will be connected (in read mode) 480 to its segment 550 at memories 450. Furthermore, according to such embodiments, the system software on a core subject to switchover also signals to controller 140 about completion of backing up its outgoing task, based on which the controller applies the updated configuration 420, i.e. identification of the incoming task ID#, for XC 430, so that the incoming task to execute on the core is connected (in write mode) 410 to memory segments 550 of tasks of its application 220, as well as so that the core of its execution will be connected in write mode to the correct memory segment 550 once that task is to be backed up 410 (see also FIG. 5 for further details). Note further that in certain embodiments of the invention, cores 120 support two sides of their working memories, to allow backing up 410 and retrieving 480 of the outgoing and incoming tasks to proceed concurrently, by copying 480 the incoming task's image to different side of the working memory than what was used for the outgoing task's image, and by switching the active side of the working memory to the incoming task's side following the copying of its image from its segment 550 at the fabric memories 450.

At more detail level in a specific embodiment, the controller 140 identifies 420, to a cross-connect (XC) 430 between the core array 115 and memory array 450, the appropriate source core from which to select the updated image 440 for each given application task specific segment 550 within the memory 450. In an alternative embodiment, each core 120 can identify 420 the application task ID# along with its updated processing image to the XC 430.

In addition, at times of task switchover, under control from the controller 140, the appropriate updated new task processing images 440 are transferred from the memories 450 through another controller controlled 335 cross-connect (XC) 470 to each given core of the array 115 subject to task switchover 120. Specifically, the controller 140 provides for the XC 470 identification of the next application tasks 440 for the individual cores of the array 115, which causes the appropriate updated processing image to be transferred 480 from the memory array 450 to each given core of the system 100 subject to task switchover.

Naturally, any given core for which the assigned application task ID# remains the same on successive core allocation periods can resume processing such task uninterruptedly through such allocation period boundaries, without having halt processing.

FIG. 5 shows, at a more detail level, a portion of the logic system 400 (see FIGS. 1 and 4 for context) for backing up the updated task processing images from the cores of the system 100 to the task specific back-up memories 450, in accordance with an embodiment of the invention. As will be discussed later on, following the description of FIG. 6, the logic system depicted in FIG. 5 is, in certain embodiments, used also for the tasks of any given application executing on the system 100 to write their inter-task communication info to each others.

In the task memory image backup mode of use of the logic per FIG. 5, according to the embodiment studied here in greater detail, each core 120 of the array 115 that is subject to task switchover transmits 410, through the XC 430 to its segment 550 in the memories 450 the updated processing image of its latest application task at the end of each core allocation period. The XC 430 comprises, in a particular embodiment, a set of application task specific multiplexers 510, each of which selects the updated processing image instance from the set 410 corresponding to its task ID# for writing 540 to its associated task specific segment 550 at the memory array 420. The multiplexers 510 make theses selections based on control 420 from the controller 140 that identifies the core that processed any given application task on the ending core allocation period. In case a given task was not being processed at a given time, in an embodiment the controller controls 420 the multiplexer associated with such task to not write anything on its associated segment 550 on the memory 450. In addition, the buses 410, 525 and 545 include a write enable indicator, along with write data (and any other relevant signals), from their source cores to the memory segments 550, to control (together with other system logic, e.g. per FIG. 7) write access from cores to memory segments 550. The role of XC 530 will be described in reference to FIG. 7; for the task memory image backup mode, the XC 530 can be considered as being controlled 535 by the controller to simply pass-through connect the write access bus 520 of each application task finishing execution on a core of the array 115 to its segment 550 at memories 450.

At digital logic design level, a possible implementation scenario for functionality per FIG. 5 is such that the signal bus instance within the set 410 carrying the updated processing images from the core ID #n (n is an integer between 0 and the number of cores in the array less 1) is connected to the data input #n of each multiplexer 510 of the XC 430, so that the identification 420 of the appropriate source core ID# by the controller to a given multiplexer 510 causes XC 430 to connect the updated task processing image transmissions 410 from the core array 115 to their proper task specific segments 550 within the memory 450.

In an embodiment, controller 140 uses information from the application task ID# addressed look-up-table per Table 5 format (shown in later in this specification) in supplying the latest processing core identifications 420 to the application task specific multiplexers 510 of XC 430.

FIG. 6 shows at greater level of detail, in accordance with an embodiment of the invention, a portion of the logic system depicted in FIG. 4 for retrieving the updated task processing images from the task specific back-up memories to their next processing cores within the system of FIG. 1. As will be discussed following this description of FIG. 6, the logic system depicted in FIG. 6 is, in certain embodiments, used also for the tasks of an application executing on the system 100 to read their inter-task communication info from each others.

According to the embodiment studied here in greater detail, the XC 470 (see FIG. 4 for context) comprises core specific multiplexers 620, each of which, when operating under the task image transfer mode, selects the updated image (from set 610) of the task identified 335 for processing by the core associated with a given multiplexer 620 to be transferred 480 to the working memory of that core 120.

Similar to the digital logic level description of the multiplexer 510 (in connection to FIG. 5), a possible implementation for functionality illustrated in FIG. 6, is such that the read data bus instance (from set 610) associated with application task ID #m (m is an integer between 0 and the number of application tasks supported by the system less 1) is connected to the data input #m of each multiplexer 620 instance, so that the identification (by the controller 140) of the active application task ID#335 for each of these core specific multiplexers 620 of XC 470 causes the XC 470 to connect to each given core 120 of the array 115 in read mode to the segment 550 at memory 450 associated with its active application task.

In an embodiment, controller 140 uses information from the core ID# addressed look-up-table per Table 4 (shown in later in this specification) in supplying the next application task identifications 335 to the application core specific multiplexers 620 of XC 470.

Fabric Network for System of FIG. 1: Inter-Task Communication Among Software Programs Executing on the Multi-Core Fabric of the System:

In addition to capabilities to activate, deactivate and relocate tasks among cores 120 of a system 100 through the task image transfers as outlined above in connection with FIGS. 4-6, the system 100 enables the tasks 240 of the application programs 220 on the system to communicate with each other, e.g. to call and return to each other, passing input and output data (incl. pointers), between cores during the core allocation periods. Such inter-task communication within an application program executing at system 100, in an embodiment of the invention, is handled by using the wiring and logic resources per FIGS. 4-6 during the task processing times (i.e. when these XC and related resources are not being used for task image transfers).

According to the herein described embodiments, where XC 430 has dedicated multiplexers 510 and 720 for each application task on the multi-core processing fabric 110, in order to provide a write access from any core of the array 115 to any task specific segment 550 at the fabric memory 450, any number of, up to all, tasks of executing on the multi-core fabric are able to concurrently write their inter-task communication information to memory segments of other tasks, in a particular implementation, at least within the scope of their own application. Similarly, embodiments of the invention where XC 470 has a dedicated multiplexer 620 for each core of the fabric, in order to provide any core of the array 115 with a read access to any task specific segment 550 at memories 450, enable any number of, up to all, tasks of executing on the array 115 to concurrently read their inter-task communication information from memories 450, in a particular implementation, specifically, from their own segments 550 at the memories 450. Moreover, such embodiments further support any mix or match of concurrent writes and reads per above. Such non-blocking inter-task communications connectivity through the fabric network 400 facilitates high data processing throughput performance for the application programs 220 configured to run on the system 100.

Figure 7:
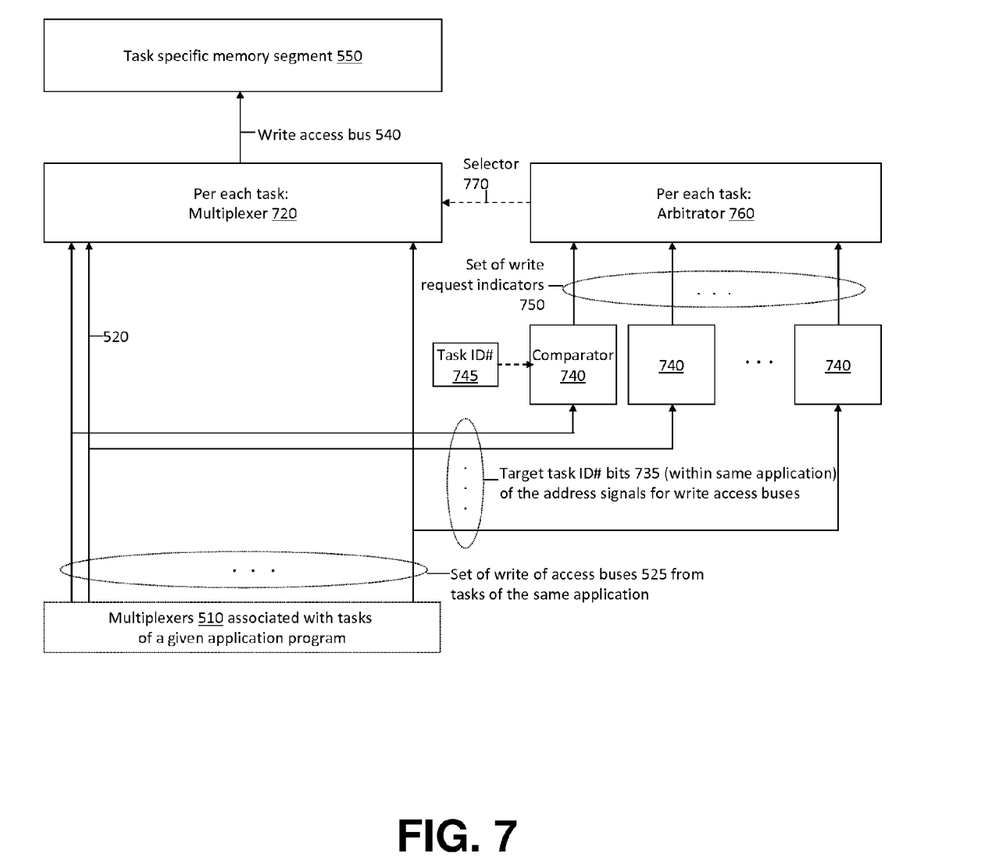
FIG. 7 presents at further detail, in accordance with an aspect of the invention, logic functionality for the system per FIG. 5, concerning a capability for tasks of an application program to write information to each other's memory segments within the system of FIG. 1.

Specifically, at a particular embodiment of the invention, the inter-task communication using the XCs 430, 470 and attached wiring shown in FIGS. 4-6 is supported among the set of tasks 230 of any given individual application program 220. Additionally, inter-application communication is supported at embodiments of system 100 through further networking, I/O and memory access means, including software based client/server and/or peer-to-peer communications techniques and networking and I/O ports as well as general memories of the cores 120 and the system 100. In a specific embodiment, the inter-task communication is facilitated through providing each task of an application, while executing on the fabric 110, with a write access 410 to the segments 550 of each other in the memory 450, and a read 480 access to their own segments 550. Following the image transfers on any core allocation period, the task executing on any core has a connection through the XC 470 to the memory segment 550 of its task, so that task specific data can be read from the memory 450 to the core where the given task is executing. In an embodiment, each task periodically polls its memory segment 550 for any new information written for it by other tasks of the application, and accordingly reads any such new information, where applicable transferring such information, or further information pointed by said new information written by other tasks (e.g. from a general memory of the system 100), to the local working memory at its processing core. In alternative embodiments, logic associated with memory segments 550 generates interrupt-type notifications to the core associated with any given memory segment 550 following a write operation to such segment, for the task 240 executing on its core 120 to know that it has new inter-task communication data to read at its memory segment 550. The receiving task controllable reading of data from its memory segment 550 is accomplished in a particular embodiment, together with the data access resources and procedures as discussed, by providing address line driven by the receiving core to its memory segment 550; in such an embodiment, the cores provide the addresses (of task specific segment 550 scope within memory 450) for the data entries to be loaded on the bus 480 connected to given core. While the connection from the buses 610 to buses 480, to connect each executing task's memory segment 550 to its processing core is connected through the XC 470, the addresses for the executing tasks to read their memory segments 550 are connected from the processing cores of the tasks to their memory segments 550 (at least conceptually) through the XC 430, which, using same control 420, connects also write access data buses from the cores to memories 450. Accordingly, in embodiments where no task running on a core of the array 115 requires simultaneous (same clock cycle) write and read access to memory 450, the same address bus, connected to memory array 450 through XC 430, can be used for controlling both data transmission 410 from and receiving 480 at the processing core of any given executing task. In other embodiments, separate read and write addresses are used, with the read address bypassing the XC 530 (and the logic per FIG. 7) i.e. getting connected directly from the multiplexer 510 to memory segment 550 of the given executing task, while the write address gets further cross-connected through the XC 530. In further embodiments still, same address bus is used for reads and writes to memory array 450, and the logic per FIG. 7 is used to connect the bus 520 from the executing task to its own segment 550 during read accesses.

In addition to the read access by any task to its own memory segment 550, by providing write access by tasks of a given application 230 to each other's memory segments 550 at the fabric memory 450, the tasks of any given application on system can communicate with each other in each direction. In an embodiment of the invention, such a write access is provided, in part, by having the control information 420, i.e. the ID# of the core assigned to any given application task, from controller 140 be applied to the XC 430 right after the completion of each run of the placement process 300, so that the information 420 is usable by the XC also during the task processing time of the core allocation periods rather than only at its end (when it is needed to direct the task image back-ups). This causes that, while the tasks of any given application are processed at whatever set of cores within the array 115, their associated write-access connections 540 to memories 450 point to their current application task segment 550 at the memories 450. Moreover, when the task ID#s of any given application, per the Table 5 format used for the info 420, comprise same common (at least conceptually most significant bits based) prefix, and when accordingly the task memory segments 550 of any given application 220 are within a contiguous memory range within the memory array 450, the set 525 (FIG. 5) of write access buses 540 of the tasks of the same application collectively point to the collective memory range of that application within the memory 450. As such, by providing a further XC 530 between said set of write access buses 525 of a given application and the eventual write access buses 645 to the task segments 550 of the given application at memory 450, and by having the application tasks from their processing cores to provide the control to the XC 530, along with their write access bus signals through the XC 430, write access by any task of an application to the memory segments 550 of all tasks of the same application is accomplished. Note that according the embodiments described here in at detail level, there is one XC 530 per each application 220 supported by the system 100.

At the image transfer time for cores subject to task switchover, the XCs 530 are to be controlled to pass through the image transfer from any core to the memory segment 550 dedicated to the task for which the given core was assigned to at the ending allocation period. In an embodiment, this image transfer time control 535 for XCs 530 is provided by the controller 140. Alternatively, it can be provided by the application tasks, using same mechanisms as during the processing time within the allocation periods (described in the following).

During the task processing time (i.e. time periods outside the task image transfer times for any given core), the bus 410 from each core through the XC 430 to the XC 530 identifies, among other relevant write access signals, the target task of its write (when applicable); this identification of the same-application-scope task ID# can be provided e.g. as specified bit range 735 (FIG. 7) within the (write) address bits of the buses 410 and 525. In an embodiment, as illustrated in FIG. 7, each application specific XC 530 comprises a set of task specific multiplexers 720 that are controlled through bus 520 instance specific comparators 740 that identify 750 whether a given executing task specific bus 520 instance is requesting a write access to the memory segment 550 dedicated to the given task that a given multiplexer 720 instance is associated with. Each comparator 740 instance sets its output 750 to active state, e.g. logic high, if its input instance among set 735 matches the ID# of the task 841 that a given set of comparators 740 are associated with (which is the same task that the arbitrator 760 and the multiplexer 720 to which the outputs 750 from the given set of comparators connect to are associated with). Though not individually drawn at FIG. 7, each of the task specific comparators 740 has its unique task ID# input 745; in an embodiment, there is one comparator with its unique task ID# input for each task of the application program that the multiplexer 720 serves. For the context of FIG. 7, the sufficient scope of task ID#s is that of intra-application; here the task ID#s 745 are to identify one task 240 of among the set of tasks 230 of a given application program 240 that logic and memory resources per FIG. 7 serve.

Among the bus 520 instances identified by their comparators 740, e.g. by high logic state on signal 750 driven by a given comparator instance, as requesting a write to the memory segment 550 of the task for which the given multiplexer 720 is dedicated to, an arbitrator logic module 760 will select 770 one bus 520 instance at a time for carrying out its write 540. The arbitrator 760 asserts a write accepted signal to the source core so selected to carry out its write, while any other cores requesting a write simultaneously will get a write request declined signal from the arbitrator 760. Though not shown in FIG. 7 for clarity of illustration of main functionality involved, the write accepted/rejected signals for any given task executing at one of the cores of the array 115, according to an embodiment of the invention, are connected from the arbitrators 760 associated with tasks of their application program through the XC 470, along with the buses 610, 480 to the core assigned to the given task; the write requested accepted/rejected indications from all tasks of a given application become part of the bus 610 instance for any task (FIG. 6), and thus any given task executing on any core will continuously get the write accepted/rejected indications from all other tasks of its local application through its receive bus 480 from the module 400.

In an embodiment, the arbitrator 760 will choose the core accepted for write 540, in case of multiple simultaneously requesting cores, by using a linearly revolving (incrementing the selected task ID# by one and returning back to 0 from highest task ID#, while skipping any tasks not requesting a write) selection algorithm, and in case of a single requesting core simply by accepting directly any singular write request. Moreover, in order to prevent any single source task, through otherwise potentially long lasting writes 540 to a given destination task memory segment 550, from blocking other tasks from their fair time share of write 540 access to the given destination task's memory, certain embodiments of module 760 will run their source task selection algorithm periodically (e.g. every 64 or 1024 clock cycles or such) and, in case of a presence of multiple tasks with an active write request, chose a revolving new task (of the tasks requesting a write) accepted for write access following successive runs of its writing task selection algorithm.

In various embodiments of the invention, the application task 240 software supports a protocol for exchanging information between themselves through the task specific segments 550 at the fabric memory array 450, so that multiple tasks are able to write successively to a memory segment 550 of a given task without overwriting each other's info, and so that the receiving task is able to keep track of any unread information written by any other task to its memory segment 550. According to one such an embodiment, each task specific memory segment 550 provides a reserved inter-task communications write and read memory space, referred to as a spool area, along with a writing control register or set of such registers at specified address(es) for the writing and reading tasks to keep track of where to write and read new information within the spool area. In certain scenarios, the spool area is divided into writing task specific sub-segments. In such scenarios, each writing task, being configured (e.g. through its task ID# within its application program) the location of its sub-segment within the spool area, can itself keep track of to which address to write its next block of information to a given receiving task's spool area, without needing a read access to any receiving task's memory segment 550. In addition, the writing tasks, after completing a write to a receiving task's spool area, in the herein discussed embodiments, update their related write control register at the receiving task's memory segment 550, to inform the receiving task of the new write operation (e.g. the address up to which there is new information to be read). When each writing task uses its spool area at receiving task's memory segment 550 as a circular buffer, with write address returning to zero after reaching the maximum length configured for their spool sub-segment, one way of preventing any given writing task from overwriting any unread information at its spool sub-segment is that each receiving task repeatedly writes for its writing tasks (using the above described inter-task communication mechanism) the maximum address up to which any given writing task is presently allowed to write at the receiving task's spool, according to until what address the receiving task has read the spool sub-segment in question. Through this method the writing task is also able to keep track of how much of its written information the receiving task has confirmedly read by any given time. As discussed above, in certain embodiments, the tasks repeatedly read the write control registers of their spool areas, to know whether and where they have newly written information from other tasks to read. In alternative embodiments, changes to write control registers cause read request notifications (e.g. through processor interrupt mechanism) from memories 450 to cores of array 115.

According to the embodiments of the invention described herein in greater detail, based on the control 335 by the controller 140 for a given core indicating that it will be subject to a task switchover, the currently executing task is made to stop executing and its processing image is backed up 410, 520, 540 to the memory 450 (FIGS. 4 and 5), and following that the memory image of the next task assigned to execute on the given core is retrieved 610, 480 to the core from the memory 450 (FIGS. 4 and 6). During these application task switching proceedings the operation of the cores subject to task switchover is controlled through the controller 140 and system software configured for the cores, with said system software managing the backing up and retrieving of the outgoing and incoming task memory images from the memories 450, as well as stopping the execution of the outgoing task before backing it up and getting the incoming task processing started once the local working memory of the core is configured with the incoming task's processing image. In these type of embodiments, cores not indicated by controller 140 as being subject to task switchover are able to continue their processing uninterruptedly even over the core allocation period transition times without any idle time.

Note that, according to embodiments of the invention described in the foregoing, applying of updated task ID# configurations 335 for the core specific multiplexers 620 of XC 470 (see FIGS. 4 and 6), as well as applying of the updated processing core ID# configurations 420 for the application task specific multiplexers 510 at XC 430 (see FIGS. 4 and 5), can thus be safely and efficiently done on one multiplexer at a time basis (reducing the system hardware and software implementation complexity and thus improving cost-efficiency), since tasks do not need to know whether and at which core in the fabric 115 they or other tasks are executing at any given time. Instead of relying on knowledge of the their respective previous, current (if any at any given time) or future execution cores by either the tasks or the system software of the cores, the invention enables flexibly running any task of any application at any core of the fabric, while providing inter-task communication more cost-efficiently through connecting the cores to their appropriate application task specific segments 550 at the fabric memories 450.

Regarding descriptions of the drawings herein, note that in various embodiments, the modules and steps of the on-chip network 400 as well as the controller 140 and process 300 providing control for the fabric network 400 can be implemented using various combinations of software and hardware logic, and for instance, various memory management techniques can be used to pass (series of) pointers to the actual memories where the updated elements of the task context are kept, rather than passing directly the actual context, etc.

Module-Level Implementation Specifications for the Application Task to Core Placement Process:

While module level logic specifications were provided in the foregoing for embodiments of the on-chip network 400, such details for embodiments of the steps of the process 300 (FIG. 3) are described in the following. In an embodiment of the invention, the process 300 is implemented by hardware logic in the controller module 140 of the system in FIG. 1.

Objectives for the core allocation algorithm 310 include maximizing the system core utilization (i.e., minimizing core idling so long as there are ready tasks), while ensuring that each application gets at least up to its entitled (e.g. a contract based minimum) share of the system core capacity whenever it has processing load to utilize such amount of cores. In the embodiment considered herein regarding the system capacity allocation optimization methods, all cores 120 of the array 115 are allocated on each run of the related algorithms 300. Moreover, let us assume that each application configured for the given multi-core system 100 has been specified its entitled quota of the cores, at least which quantity of cores it is to be allocated whenever it is able to execute on such number of cores in parallel; typically, sum of the applications' entitled quotas is not to exceed the total number of cores in the system. More precisely, according to the herein studied embodiment of the allocation algorithm 310, each application program on the system gets from each run of the algorithm:

(1) at least the lesser of its (a) entitled quota and (b) Core Demand Figure (CDF) worth of the cores (and in case (a) and (b) are equal, the 'lesser' shall mean either of them, e.g. (a)); plus
(2) as much beyond that to match its CDF as is possible without violating condition (1) for any application on the system; plus
(3) the application's even division share of any cores remaining unallocated after conditions (1) and (2) are satisfied for all applications sharing the system.

In an embodiment of the invention, the cores 120 to application programs 220 allocation algorithm 310 is implemented per the following specifications:

(i) First, any CDFs 135 by all application programs up to their entitled share of the cores within the array 115 are met. E.g., if a given program #P had its CDF worth zero cores and entitlement for four cores, it will be allocated zero cores by this step (i). As another example, if a given program #Q had its CDF worth five cores and entitlement for one core, it will be allocated one core by this stage of the algorithm 310.

(ii) Following step (i), any processing cores remaining unallocated are allocated, one core per program at a time, among the application programs whose demand 135 for processing cores had not been met by the amounts of cores so far allocated to them by preceding iterations of this step (ii) within the given run of the algorithm 310. For instance, if after step (i) there remained eight unallocated cores and the sum of unmet portions of the program CDFs was six cores, the program #Q, based on the results of step (i) per above, will be allocated four more cores by this step (ii) to match its CDF.

(iii) Following step (ii), any processing cores still remaining unallocated are allocated among the application programs evenly, one core per program at time, until all the cores of the array 115 are allocated among the set of programs 210. Continuing the example case from steps (i) and (ii) above, this step (iii) will be allocating the remaining two cores to certain two of the programs. In particular embodiments, the programs with zero existing allocated cores, e.g. program #P from step (i), the are prioritized in allocating the remaining cores at the step (iii) stage of the algorithm 310.

Moreover, in a certain embodiments, the iterations of steps (ii) and (iii) per above are started from a revolving application program within the set 210, e.g. so that the application ID # to be served first by these iterations is incremented by one (and returning to the ID #0) for each successive run of the process 300 and the algorithm 310 as part of it. Moreover, embodiments of the invention include a feature by which the algorithm 310 allocates for each application program, regardless of the CDFs, at least one core once in a specified number (e.g. sixteen) of process 300 runs, to ensure that the each application will be able to keep at least its CDF 135 input to the process 300 updated.

According to descriptions and examples above, the allocating of the array of cores 115 according to the embodiments of the algorithm 310 studies herein in detail is done in order to minimize the greatest amount of unmet demands for cores (i.e. greatest difference between the CDF and allocated number of cores for any given application 220) among the set of programs 210, while ensuring that any given program gets at least its entitled share of the processing cores following such runs of the algorithm for which it demanded 130 at least such entitled share of the cores.

Once the set of cores 115 are allocated 310 among the set of applications 210, specific core 120 instances are assigned to each application 220 that was allocated one or more cores on the given core allocation algorithm run 310. In an embodiment, one schedulable 240 task is assigned per one core 120. Objectives for the application task to core placement algorithm 330 include minimizing the total volume of tasks to be moved between cores (for instance, this means that tasks continuing their execution over successive core allocation periods will stay on their existing core). In certain embodiments of the invention, the system controller 140 assigns the set of cores (which set can be zero at times for any given application) for each application, and further processes for each application will determine how any given application utilizes the set of cores being allocated to it. In other embodiments, such as those studied herein in further detail, the system controller 140 also assigns a specific application task to each core.

To study details of an embodiment of the placement algorithm 330, let us consider the cores of the system to be identified as core #0 through core #(N-1), wherein N is the total number of pooled cores in a given system 100. For simplicity and clarity of the description, we will from hereon consider an example system under study with a relatively small number N of sixteen cores. We further assume here a scenario of relatively small number of also sixteen application programs configured to run on that system, with these applications identified for the purpose of the description herein alphabetically, as application #A through application #P. Note however that the invention presents no actual limits for the number of cores, applications of task for a given system 100. For example, instances of system 100 can be configured a number of applications that is lesser or greater (as well as equal to) the number of cores.

Following the allocation 310 of the cores among the applications, for each active application on the system (that were allocated one or more cores by the latest run of the core allocation algorithm 310), the individual ready-to-execute tasks 240 are selected and mapped 330 to the cores assigned to the given application. In the embodiments discussed herein in greater detail, the task to core mapping algorithm for any application begins by keeping any tasks, which were selected to run on the array 115 on the ongoing (i.e. ending) allocation period as well as the next one, mapped to their current cores also on the next allocation period. After that rule is met, any newly selected tasks for the application are mapped to their processing cores in their priority order. Specifically, in an embodiment, each application maintains a priority ordered list (see element 135 in FIG. 3) of its ready to execute tasks, and following any given run of the core-to-application allocation algorithm 310, assuming that a given application was assigned P (a positive integer) cores beyond those used by the continuing tasks, P highest priority ready but not-yet-mapped tasks of the application are mapped 330 to the P cores allocated to the application. In case the application had less than P ready tasks, the highest priority other (e.g. waiting, not ready) tasks are mapped to the cores beyond the cores for which the ready tasks of the application were mapped to; these other tasks can thus directly begin executing on their mapped cores once they become ready.

Summary of Process Flow and Information Formats Produced and Consumed by Main Stages of the Application Task to Core Placement Process:

The production of updated task contents 335 for the processing cores 120 of the system 100 by the process 300 (FIG. 3, implemented by controller 140 in FIG. 1) from the Core Demand Figures (CDFs) 130 of the applications 220 (FIG. 2), as detailed above with module level implementation examples, proceeds through the following stages and intermediate results (in reference to FIG. 3), according to an embodiment of the invention:

Each application 220 produces its CDF 130, e.g. an integer between 0 and the number of cores within the array 115 expressing how many concurrently executable tasks 240 the application presently has ready to execute. A possible implementation for the information format 130 is such that logic in the controller module periodically samples the CDF bits from the segment 550 at memory 450 dedicated to the (root process) task #0 of each application for the core allocation module 310 and forms an application ID-indexed table (per Table 1 below) as a 'snapshot' of the application CDFs to launch the process 300. An example of the format of the information 130 is provided in Table 1 below—note however that in the hardware logic implementation, the application ID index, e.g. for range A through P, is represented by a digital number, e.g., in range 0 through 15, and as such, the application ID # serves as the index for the CDF entries of this array, eliminating the need to actually store any representation of the application ID for the table providing information 130:

TABLE 1

| Application ID index | CDF value |
|---|---|
| A | 0 |
| B | 12 |
| C | 3 |
| ... | ... |
| P | 1 |

Regarding Table 1 above, note that the values of entries shown are simply examples of possible values of some of the application CDFs, and that the CDF values of the applications can change arbitrarily for each new run of the process 300 and its algorithm 310 using the snapshot of CDFs.

Based at least in part on the application ID # indexed CDF array 130 per Table 1 above, the core allocation algorithm 310 of the process 300 produces another similarly formatted application ID indexed table, whose entries 315 at this stage are the number of cores allocated to each application on the system, as shown in Table 2 below:

TABLE 2

| Application ID index | Number of cores allocated |
|---|---|
| A | 0 |
| B | 6 |
| C | 3 |
| ... | ... |
| P | 1 |

Regarding Table 2 above, note again that the values of entries shown are simply examples of possible number cores of allocated to some of the applications after a given run on the algorithm 310, as well as that in hardware logic this array 315 can be simply the numbers of cores allocated per application, as the application ID# for any given entry of this array is given by the index # of the given entry in the array 315.

The application task selection sub-process of mapping algorithm 330 uses as one of its inputs application specific priority ordered lists 135 of the ready task IDs of the applications; each such application specific list has the (descending) task priority level as their index, and the task ID# as the value stored at such indexed element, as shown in Table 3 below—notes regarding implicit indexing and non-specific examples used for values per Table 1-2 apply also for Table 3:

TABLE 3

| Task priority index # - application internal (lower index value signifies more urgent task) | Task ID # (points to start address of the task-specific sub-range 550 within the per-application dedicated address range at memory 450) |
|---|---|
| 0 | 0 |
| 1 | 8 |
| 2 | 5 |
| ... | ... |
| 15 | 2 |

In an embodiment, each application 220 maintains an array 135 per Table 3 at specified address at its task #0 segment 550 at memory 450, from where logic at module 330 retrieves this information to be used as an input for the task to core mapping algorithm 330.

Based at least in part on the application ID # indexed allocated core count array 315 per Table 2 above, the core to application assignment algorithm produces a core ID# indexed array 325 expressing to which application ID each given core of the fabric 110 got assigned.

The application task to processing core mapping sub-process of the algorithm 330 uses information 135 per Table 3, to produce a core ID# indexed array 335 of the application and task IDs that the core # of the given index got assigned to, per Table 4 below:

TABLE 4

| Core ID index | Application ID | Task ID (within the application of column to the left) |
|---|---|---|
| 0 | P | 0 |
| 1 | B | 0 |
| 2 | B | 8 |
| ... | ... | ... |
| 15 | N | 1 |

Regarding Table 4 above, note that the symbolic application IDs (A through P) used here for clarity will in digital logic implementation map into numeric representations, e.g. in the range from 0 through 15. Also, the notes per Tables 1-3 above regarding the implicit indexing (i.e., core IDs for any given application ID entry are given by the index of the given entry, eliminating the need to store the core IDs in this array) apply for the logic implementation of Table 4 as well.

In hardware logic implementation the application and the intra-application task IDs of Table 4 can be bitfields of same digital entry at any given index of the array 335; the application ID bits can be the most significant bits (MSBs) and the task ID bits the least significant (LSBs), and together these, in at least one embodiment, form the start address of the active application task's address memory range in the memory array 450 (for the core with ID# equaling the given index to application task ID# array per Table 4).

Finally, a further LUT at controller 140 in the herein studied embodiments is indexed with the application and task IDs, and provides as its contents the processing core ID (if any), per Table 5 below—notes regarding implicit indexing and non-specific example content values per preceding Tables apply also for Table 5:

TABLE 5

| Application ID - MSBs of index | Task ID (within the application of column to the left) - LSBs of index | Processing core ID (value 'N' here indicates that the given task is not presently selected for execution at any of the cores) |
|---|---|---|
| A | 0 | 0 |
| A | 1 | N |
| ... | ... | |
| A | 15 | 3 |
| B | 0 | 1 |
| B | 1 | N |
| ... | ... | |
| B | 15 | 7 |
| C | 0 | 2 |
| ... | ... | ... |
| P | 0 | 15 |
| ... | ... | |
| P | 15 | N |

By comparing Tables 4 and 5 above, it is seen that the information contents at Table 5 are the same as at Table 4; the difference in purposes between them is that while Table 4 gives for any core 120 its active application task ID#335 to process, Table 5 gives for any given application task its processing core 420 (if any at a given time). As seen from FIGS. 4-6, the Table 4 outputs are used to configure the core specific multiplexers 620 at XC 470, while the Table 5 outputs are used to configure the application task specific multiplexers 510 at XC 430.

Use-Case Scenarios and Benefits

According to the foregoing, the invention allows efficiently sharing a multi-core based computing hardware among a number of application software programs, each executing on a time variable number of cores, maximizing the whole system data processing throughput, while providing deterministic minimum system processing capacity access levels for each one of the applications configured to run on the given system.

Besides having the algorithm that allocates the system cores among the applications to ensure that each application gets at least up to the lesser of its CDF and its (e.g. contract based) entitled quota worth of cores on each run of the algorithm, in certain embodiments of the invention, the applications are given credits based on their CDFs (as used by allocation algorithm runs) that were less than their entitlements. For instance, a user application can be given discounts on its utility computing contract as a function of how much less the application's average CDFs on contract periods (e.g., a day) were compared to the application's contract based entitlement of system's core capacity.

As an example, if a user applications' average CDFs were p % (p=0 to 100) less than the application's contract-based minimum system core access entitlement, the user can be given a discount of e.g. 0.25-times-p % its contract price for the period in question. Further embodiments can vary this discount factor D (0.25 in above example) depending on the average busyness of the applications on the system during the discount assessment period (e.g. one hour period of the contract) in question, causing D to vary for instance in the range from 0.1 to 0.9.

Moreover, the utility computing system operator can offer client computing capacity service contracts with non-uniform discount factor D time profiles, e.g., in a manner to make the contract pricing more attractive to specific type of customer applications with predictable busyness time profiles, and consequently seek to combine contracts 220 with non-overlapping D profile peaks (time periods with high discount factor) into shared compute hardware 100, 110 capacity pools. Such arrangement can lead both to improving the revenues from the compute hardware capacity pool to the utility computing service provider, as well improving the application program performance and throughput volume achieved for each of the customers running their applications 220 on the shared multi-core system 100. Generally, offering contracts to the users sharing the system so that the peaks of the D profiles are minimally overlapping can facilitate spreading the user application processing loads on the given system 100 more evenly over time, and thus lead to maximizing both the system utilization efficiency as well as the performance (per given cost budget) experienced by each individual user application sharing the system.

In further embodiments, the contract price (e.g. for an entitlement up to four of the sixteen cores in the system whenever the application so demands) can vary from one contract pricing period to another e.g. on hourly basis (to reflect the relative expected or average busyness of the contract billing periods during a contract term), while in such scenarios the discount factor D can remain constant.

Generally, goals for such discounting methods can include providing incentives for the users of the system to balance their application processing loads for the system more evenly over periods of time such as hours within a day, and days within a week, month etc. (i.e., seeking to avoid both periods of system overload as well as system under-utilization), and providing a greater volume of surplus cores within the system (i.e. cores that applications could have demanded within their entitlements, but some of which did not demand for a given run of the allocation algorithm) that can be allocated in a fully demand adaptive manner among those of the applications that can actually utilize such cores beyond their entitled quota of cores, for faster i.e. more parallelized execution of their tasks. Note that, according to these embodiments, the cores that an application gets allocated to it beyond its entitlement do not cost the user anything extra.

Accordingly, the system of FIG. 1 (and as further detailed in FIGS. 2-7 and related descriptions), in particular when combined with pricing discount factor techniques per above, enables maximizing the overall utility computing cost-efficiency.

Moreover, the fabric network 400 (described in relation to FIGS. 4-7) enables running any application task on the system at any of its cores at any given time, in a restriction free manner, with minimized overhead, including minimized core idle times, and without a need for system software during the system runtime operation (i.e., after its startup or maintenance configuration periods). According to the described embodiments of the invention, the fabric network achieves this optimally flexible use of the cores of the system logic and wiring resource efficiently, without a need for either application to application, task to task level or core to core level cross-connectivity, as well as memory efficiently without a need for the cores to hold more than one task's image within their memories at a time. Instead of needing application task to task or core to core cross-connects for inter-task communications and/or memory image transfers, the invention achieves their purposes by more efficiently (in terms of system resource usage) through a set of multiplexers connecting the cores to application task specific segments at the fabric memory. The invention thereby enables application tasks running on any core of the fabric to communicate with any other task of the given application without requiring any such communicating task to know whether and where (at which core) the other tasks are running at any given time. The invention thus provides improved scalability for parallel processing systems as the number of cores, applications and tasks within applications grows.

The invention thus enables each application program to dynamically get a maximized number of cores that it can utilize in parallel so long as such demand-driven core allocation allows all applications on the system to get at least up to their entitled number of cores whenever their processing load actually so demands.

It is further seen that the invented data processing system is able to dynamically optimize the allocation of its parallel processing capacity among a number of concurrently running processing applications, in a manner that is adaptive to real-time processing loads offered by the applications, without having to use any of the processing capacity of the multi-core system for any non-user (system) software overhead functions, at least beyond system startup and maintenance periods.

Accordingly, a listing of benefits of the invented, application load adaptive, operating system overhead free multi-user data processing system includes:

All the application processing time of all the cores across the system is made available to the user applications, as there is no need for a common system software to run on the system (e.g. to perform in the cores traditional operating system tasks such as time tick processing, serving interrupts, scheduling and placing applications and their tasks to the cores, and managing the context-switching between the running programs).

The application programs do not experience any considerable delays in ever waiting access to their (e.g. contract-based) entitled share of the system's processing capacity, as any number of the processing applications configured for the system can run on the system concurrently, with a dynamically optimized number of parallel cores allocated per an application.

The allocation of the processing time across all the cores of the system among the application programs sharing the system is adaptive to the realtime processing loads of these applications.

There is inherent security and isolation between the individual processing applications in the system, as each application resides in its dedicated (logical) segment of the system memory, and can safely use the shared processing system effectively as if it was the sole application running on it. This hardware based security among the application programs and tasks sharing a multi-core data processing system per the invention further facilitates more straightforward, cost-efficient and faster development and testing of applications and tasks to run on such systems, as undesired interactions between the different user application programs can be disabled already at the system hardware level.

The invention thus enables maximizing the data processing throughput across all the processing applications configured to run on the shared multi-core computing system.

The hardware based scheduling and context switching of the invented system accordingly ensures that each application gets at least its entitled time share of the shared processing system capacity whenever any given processing application actually is able to utilize at least its entitled quota of system capacity, and as much processing capacity beyond its entitled quota as is possible without blocking the access to the entitled and fair share of the processing capacity by any other processing application that is actually able at any given time to utilize such capacity that it is entitled to. The invention thus enables any given user application to get access to the full processing capacity of the multi-core system whenever the given application is the sole application offering processing load for the shared multi-core system. In effect, the invention provides for each user application assured access to its contract based percentage (e.g. 10%) of the multi-core system throughput capacity, plus most of the time much greater share, even 100%, of the processing system throughput capacity, with the cost base for any given user application being largely defined by only its committed access percentage worth of the shared multi-core processing system costs.

The reference [1] provides further reference specifications and use cases for aspects of embodiments of the invented techniques.

CONCLUSIONS

This description and drawings are included to illustrate the architecture and operation of practical embodiments of the invention, but are not meant to limit the scope of the invention. For instance, even though the description does specify certain system parameters to certain types and values, persons of skill in the art will realize, in view of this description, that any design utilizing the architectural or operational principles of the disclosed systems and methods, with any set of practical types and values for the system parameters, is within the scope of the invention. For instance, in view of this description, persons of skill in the art will understand that the disclosed architecture sets no actual limit for the number of cores in a given system, or for the maximum number of applications or tasks to execute concurrently. Moreover, the system elements and process steps, though shown as distinct to clarify the illustration and the description, can in various embodiments be merged or combined wither other elements, or further subdivided and rearranged, etc., without departing from the spirit and scope of the invention. It will also be obvious to implement the systems and methods disclosed herein using various combinations of software and hardware. Finally, persons of skill in the art will realize that various embodiments of the invention can use different nomenclature and terminology to describe the system elements, process phases etc. technical concepts in their respective implementations. Generally, from this description many variants will be understood by one skilled in the art that are yet encompassed by the spirit and scope of the invention.

What is claimed is:

1. A digital logic system for communications among a set of processing tasks of a software program, the system comprising:
   a memory segment for each task of said set, to allow the tasks to communicate with each other while running in parallel on an array of processing cores;
   hardware logic for at least one task of the set to write its inter-task communication information to a memory segment of another task of the set; and
   hardware logic for at least one task of the set to read its inter-task communication information from its own memory segment,
   wherein the hardware logic for at least one task of the set to write its inter-task communication information comprises at least one multiplexer specific to a given task of the set, with said multiplexer configured to connect write access buses from the processing cores on which the tasks of the program are running to the memory segment of the given task; and
   wherein the hardware logic for at least one task of the set to read its inter-task communication information comprise at least one multiplexer specific to a given core of the array, with said multiplexer configured to connect read access buses from memory segments of tasks of the set to the given core of the array.

2. The system of claim 1, wherein any number of tasks of said set are able to concurrently write their inter-task communication information to memory segments of other tasks of the set.

3. The system of claim 1, wherein any number of-tasks of said set are able to concurrently read their inter-task communication information from their own memory segments.

4. The system of claim 1, wherein the hardware logic for at least one task of the set to write its inter-task communication information comprises at least one arbitrator specific to a given task of the set, with said arbitrator deciding which task from a set of tasks requesting write access to the memory segment of the given task is granted write access to said memory segment.

5. A method for communications among a set of processing tasks of a software program, the method comprising:
   providing a memory segment for each task of said set, for the tasks to communicate with each other while running in parallel on an array of processing cores;
   by at least one task of the set, writing its inter-task communication information to a memory segment of another task of the set; and
   by at least one task of the set, reading inter-task communication information from its own memory segment,
   wherein the writing involves at least one multiplexer that is specific to a memory segment of a given task, with said multiplexer configured to connect write access buses from the processing cores on which the tasks of the program are running to the memory segment of the given task; and
   wherein the reading involves at least one multiplexer that is specific to a given core of the array, with said multiplexer configured to connect read access buses from memory segments of the tasks of the set to the given core of the array.

6. The method of claim 5, wherein the writing is supported concurrently for any number of tasks of said set.

7. The method of claim 5, wherein the reading is supported concurrently for any number of tasks of said set.

8. The method of claim 5, wherein the writing involves at least one arbitrator that is specific to a memory segment of a given task, with said arbitrator deciding which task from a set of tasks requesting write access to the memory segment of the given task is granted write access to said memory segment.

* * * * *